United States Patent [19]

Kitta

[11] Patent Number: 4,817,374
[45] Date of Patent: Apr. 4, 1989

[54] EXHAUST CONTROL DEVICE OF ENGINE

[75] Inventor: Hideaki Kitta, Iwata, Japan

[73] Assignee: Yamaha Hatsudoki Kabushiki Kaisha, Iwata, Japan

[21] Appl. No.: 96,592

[22] Filed: Sep. 11, 1987

[30] Foreign Application Priority Data

Sep. 13, 1986 [JP] Japan .................. 61-215043

[51] Int. Cl.$^4$ ............................................. F02B 27/02
[52] U.S. Cl. ......................................... 60/313; 60/323; 137/595; 180/219
[58] Field of Search .................. 60/313, 323; 137/595; 180/219

[56] References Cited

U.S. PATENT DOCUMENTS

| 933,906 | 9/1909 | Illy . |
| 1,411,226 | 3/1922 | Stumpf . |
| 2,230,740 | 2/1941 | Birkigt . |
| 2,239,262 | 4/1941 | Violet . |
| 2,305,946 | 12/1942 | Wilson et al. . |
| 2,627,851 | 2/1953 | Cushman . |
| 2,644,436 | 7/1953 | Berlyn . |
| 2,686,398 | 8/1954 | Anderson . |
| 2,717,583 | 9/1955 | Maybach et al. . |
| 3,523,418 | 8/1970 | Marsee . |
| 3,751,921 | 8/1973 | Blomberg et al. . |
| 3,817,227 | 6/1974 | Onishi . |
| 3,938,330 | 2/1976 | Nakajima et al. . |
| 3,969,895 | 7/1976 | Krizman . |
| 4,051,821 | 10/1977 | Amann . |
| 4,254,752 | 3/1981 | Friddell et al. . |
| 4,312,381 | 1/1982 | Ratner ................... 137/595 |
| 4,359,865 | 11/1982 | Nakao .................... 60/313 |
| 4,522,029 | 6/1985 | Tomita et al. . |
| 4,539,813 | 9/1985 | Tomita et al. . |
| 4,545,200 | 10/1985 | Oike et al. . |
| 4,554,785 | 11/1985 | Oike . |
| 4,558,566 | 12/1985 | Shirakura . |
| 4,655,252 | 4/1987 | Krumhansl ............ 137/595 |

FOREIGN PATENT DOCUMENTS

| 51-54118 | 5/1976 | Japan . |
| 2620444 | 6/1926 | United Kingdom . |
| 231156 | 9/1926 | United Kingdom . |
| 519806 | 4/1940 | United Kingdom . |
| 542429 | 1/1942 | United Kingdom . |
| 561932 | 6/1944 | United Kingdom . |

Primary Examiner—Douglas Hart
Attorney, Agent, or Firm—Ernest A. Beutler

[57] ABSTRACT

An exhaust control device for an exhaust system for an internal combustion engine specifically applied to a motorcycle. An exhaust control device is incorporated that includes a single valve body having a plurality of exhaust gas passages that cooperate with each of a plurality of exhaust pipes that extend from the engine to the valve body. Parallel valve shafts are supported in the valve body and support valves that control the flow through the exhaust gas passages.

17 Claims, 7 Drawing Sheets

EXHAUST CONTROL DEVICE OF ENGINE

CROSS-REFERENCE TO RELATED APPLICATIONS

This application relates to an improvement in high performance exhaust systems for internal combustion engines of the type shown in co-pending applications Ser. Nos. 935,340 pending and 935,342 pending, filed Nov. 26, 1986, in the name of Hideaki Ueda, and to an improved valve arrangement and more particularly to an improved exhaust control means for engines of the type generally shown in the co-pending applications Ser. Nos. 022,434 pending, 022,660 now U.S. Pat. No. 4,765,137 and 022,732 pending, filed Mar. 6, 1987, in the names of Tadashi Sakurai and Wataru Fuchigami; Tadashi Sakurai and Wataru Fuchigami; and Tadashi Sakurai, Wataru Fuchigami and Hideaki Kitta, respectively, all of which applications are assigned to the assignee of this invention.

BACKGROUND OF THE INVENTION

As noted above, this invention relates to an exhaust control device for an engine, and more particularly to an improved device for controlling the exhaust gases in a multiple cylinder engine so as to improve the performance of the engine throughout the entire speed and load ranges.

As is noted in the aforesaid co-pending applications of Hideaki Ueda, Ser. Nos. 935,340 and 935,342, it has been found that the configuration and design of an exhaust system for a multiple cylinder engine can have a significant and profound effect on the engine's performance curves. For example, under some running conditions, the exhaust gases from one cylinder may interfere with the flow of exhaust gases from another cylinder and substantially reduce the performance under mid-range conditions, even though the system is designed to provide good performance under high speed conditions. It has been found that the performance of the engine can be significantly improved by employing a valve or reflective device in the individual exhaust pipes leading from the respective exhaust ports and which is controlled in response to engine running conditions so as to avoid the interference which might otherwise be caused from the exhaust pulses from one cylinder interrupting with the exhaust flow from another cylinder. In connection with providing such control, it is desirable if each exhaust pipe is supplied with its own individual exhaust control valve in order to avoid the aforenoted dilatorious effects. However, when providing such multiple exhaust valves, there are substantial difficulties in providing a compact construction and also one which will not be adversely affected by the high temperatures of the exhaust gases.

In addition to the foregoing purpose, such exhaust control valves may be employed for generating a self E.G.R. (exhaust gas recirculation) effect to improve exhaust gas emission control.

It is, therefore, a principal object of this invention to provide an improved exhaust control device for an engine.

It is a further object of this invention to provide an improved control valve for controlling the exhaust gases of multiple exhaust pipes of a multiple cylinder internal combustion engine.

It is a further object of the invention to provide an improved, compact control valve for the exhaust gases of an engine wherein the effects of heat on the valve are substantially minimized.

Of course, it is possible to design a control valve wherein one shaft is rotatably journaled in a common valve body and supports a plurality of valves for controlling the flow through the respective exhaust passages. However, the provision of such a long control shaft presents problems in connection with heat effects. That is, the thermal expansion of a long shaft will be greater than that of a short shaft and, accordingly, certain problems can result in connection with such single shaft arrangements. If multiple shafts are employed, the construction must be such that the shafts can be conveniently interrelated for movement, and the resulting valve body must still be compact in construction.

It is, therefore, a still further object of this invention to provide an improved exhaust control device for engines having multiple interconnected shafts in a single valve body.

Although engines embodying exhaust control devices for improving their performance may find application in a wide variety of vehicles, one type of vehicle in which such devices are particularly useful is a motorcycle. In connection with motorcycles, one common configuration places the cylinders of the engine in a transversely disposed relationship, and the exhaust pipes from the cylinders extend forwardly, downwardly, and then pass beneath the engine before discharge to the atmosphere. With such an arrangement, the exhaust control device may frequently be positioned beneath the engine, and thus it can significantly effect the ground clearance, both when traveling in a straight ahead direction and also when cornering wherein the rider normally leans the motorcycle to assist in turning. However, if the control valve has any substantial transverse dimension, it can seriously interfere with the amount of leaning which can be accomplished by the rider.

It is, therefore, a still further object of this invention to provide an improved, compact exhaust control valve for a vehicle which will have a compact configuration and which can be placed beneath the engine of a vehicle such as a motorcycle.

SUMMARY OF THE INVENTION

This invention is adapted to be embodied in an exhaust system for an internal combustion engine having first and second exhaust ports and first and second exhaust pipes extending respectively from the exhaust ports. A single valve body is formed with first and second exhaust passages and means communicate the first and second exhaust pipes respectively with the valve body first and second exhaust passages. First and second valve shafts are rotatably journaled within the valve body and each carry respective first and second valve elements for controlling the effective area of the first and second exhaust passages. Means are provided at one end of one of said shafts for actuating said one valve shaft, and means are provided for interconnecting the shafts for simultaneous rotation so that all of the valves will be operated simultaneously by a single operator.

Another feature of the invention is adapted to be embodied in combination with a motorcycle having an engine and exhaust system as described in the preceding paragraph. In connection with such an application, the valve body is positioned beneath the engine of the motorcycle and the exhaust passages are formed vertically above each other so as to reduce the width of the valve body.

DETAILED DESCRIPTION OF THE PREFERRED EMBODIMENTS OF THE INVENTION

Figure 1:
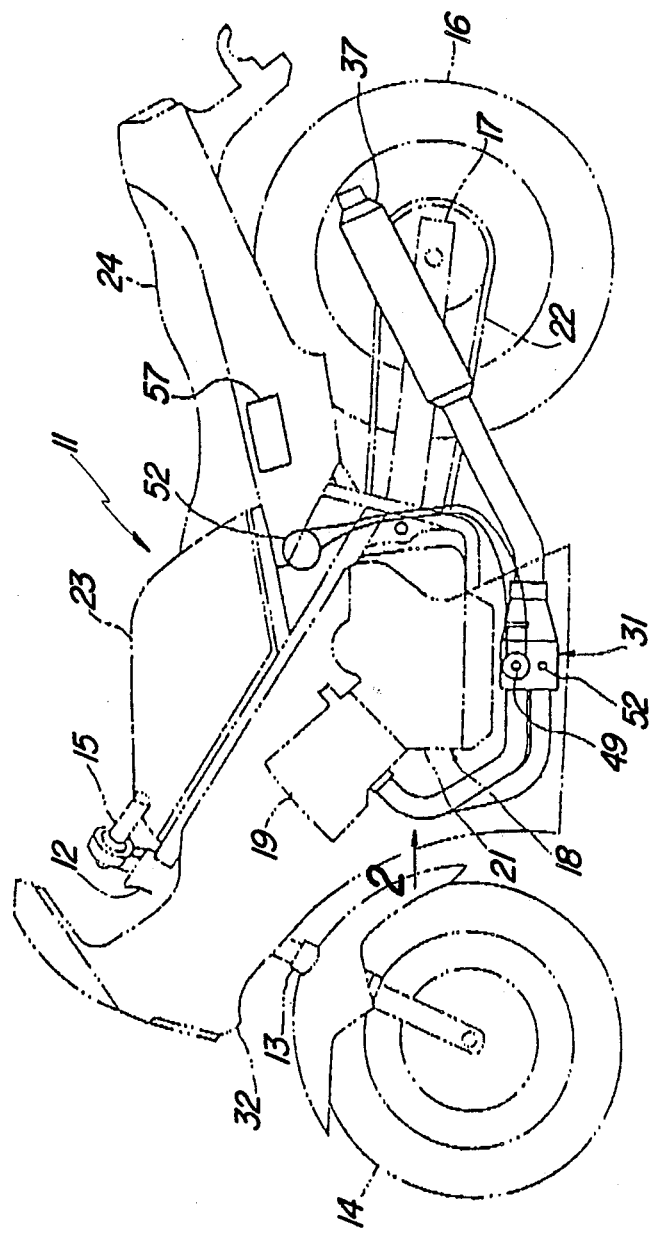
FIG. 1 is a side elevational view of a motorcycle powered by an internal combustion having an exhaust system constructed in accordance with an embodiment of the invention. The components of the motorcycle other than the exhaust system are shown in phantom.

Referring first to FIG. 1, a motorcycle powered by an internal combustion engine having an exhaust system constructed in accordance with an embodiment of the invention is indicated generally by the reference numeral 11. The invention is described in conjunction with a motorcycle 11 because of the fact that the invention has particular utility in connection with such vehicles due to the compact size and configuration of the the exhaust control device. It is to be understood, however, that the invention may be utilized in conjunction with other types of vehicles than motorcycles or, for that matter, in connection with other installations involving internal combustion engines. The invention has particular utility, however, in improving the performance of an engine that is called upon to run through a wide variety of speed and load conditions.

The motorcycle 11 is comprised of a frame assembly 12 that carries a front fork 13 that rotatably journals a front wheel 14. A handlebar assembly 15 is affixed to the upper end of the front fork 13 for steering the front wheel 12 in a known manner.

A rear wheel 16 is journaled at the rear end of the frame assembly 12 by means including a trailing arm assembly 17. The rear wheel 16 is driven by means of an internal combustion engine transmission assembly, indicated generally by the reference numeral 18 and which is supported within the frame assembly 12 in a known manner. Although the engine transmission assembly 18 may be of any known type, it is depicted as being of the multiple cylinder in line type. As such, there is provided a cylinder block 19 which extends transversely across the motorcycle 11 and in which forwardly inclined cylinder bores (not shown) are supported. The cylinder block assembly 19 is mounted to a combined crankcase transmission assembly 21, as is typical with motorcycle practice, that incorporates an output shaft (not shown) for driving the rear wheel 16 by means of a chain 22 or the like.

A fuel tank 23 is supported by the frame assembly 12 above the engine transmission assembly 18. A seat 24 is carried by the frame assembly 12 rearwardly of the fuel tank 23 for accommodating a rider.

Figure 2:
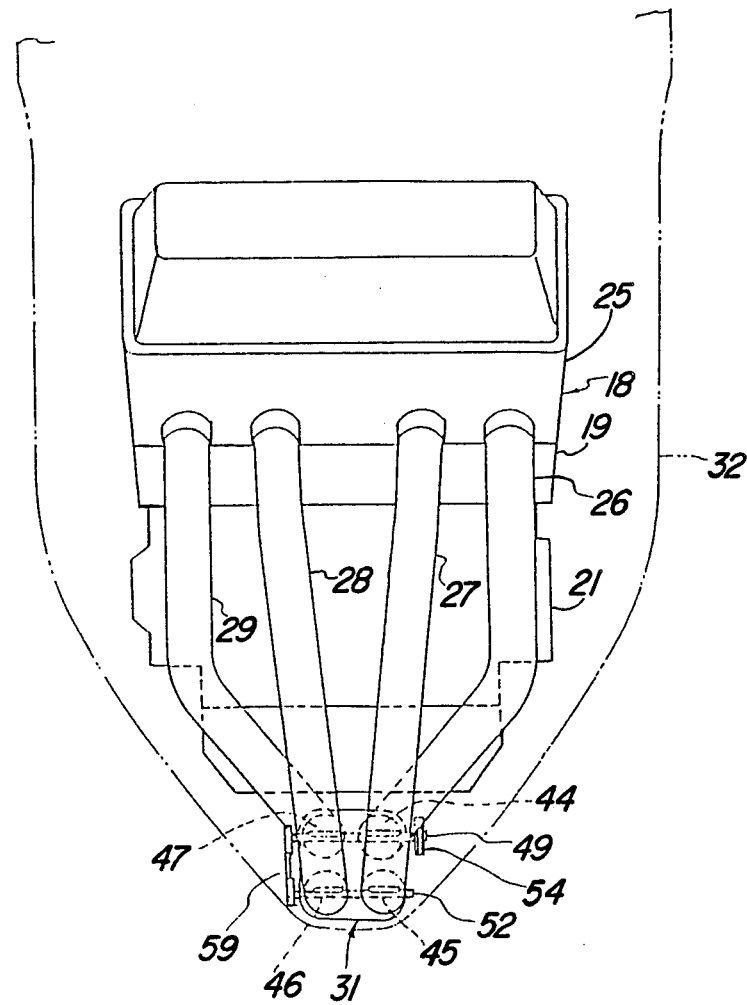
FIG. 2 is a front elevational view of the engine and exhaust system looking generally in the direction of the arrow 2 in FIG. 1 and is on an enlarged scale.
Figure 3:
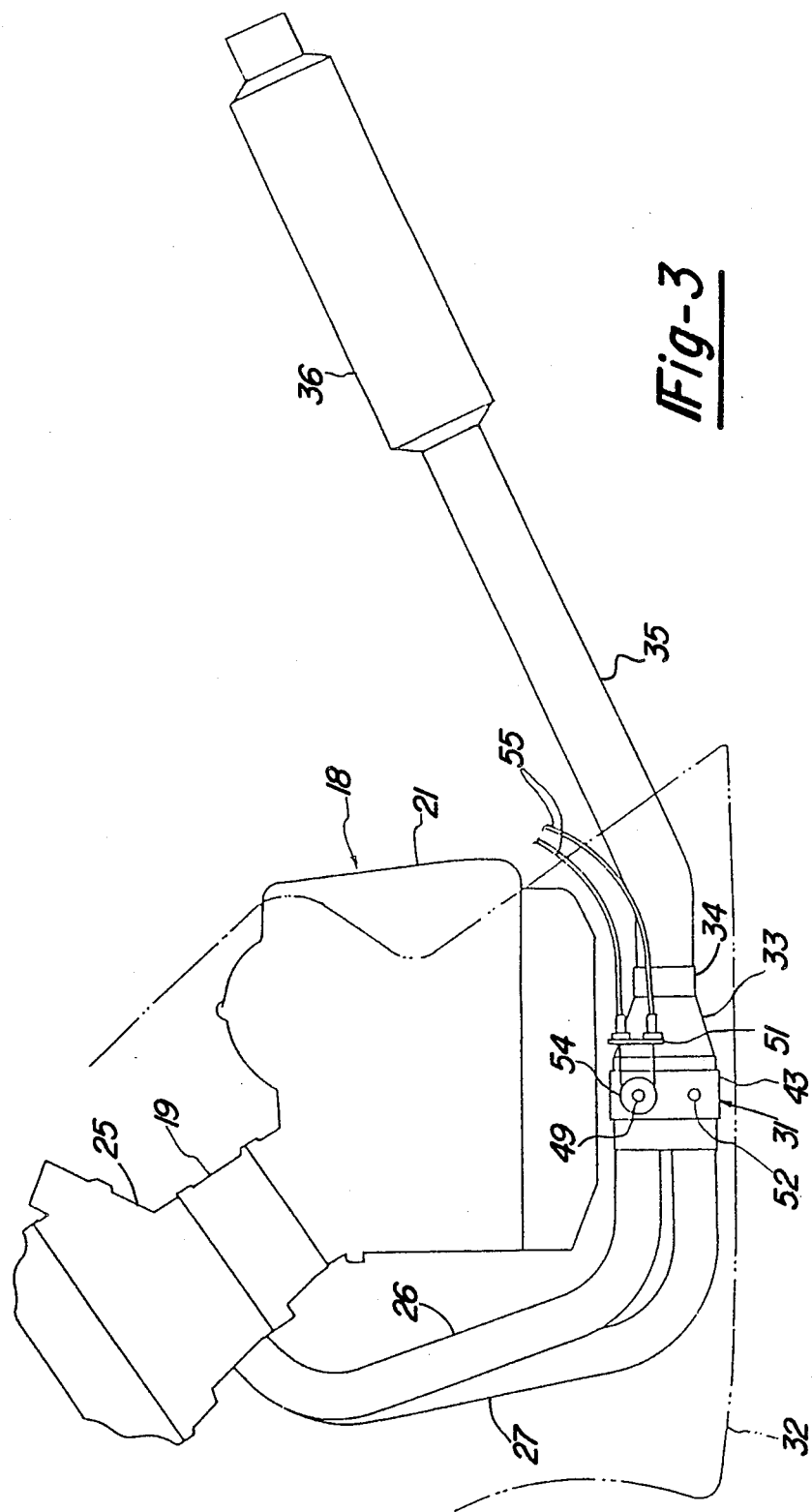
FIG. 3 is an enlarged side elevational view of the engine and exhaust system.
Figure 4:
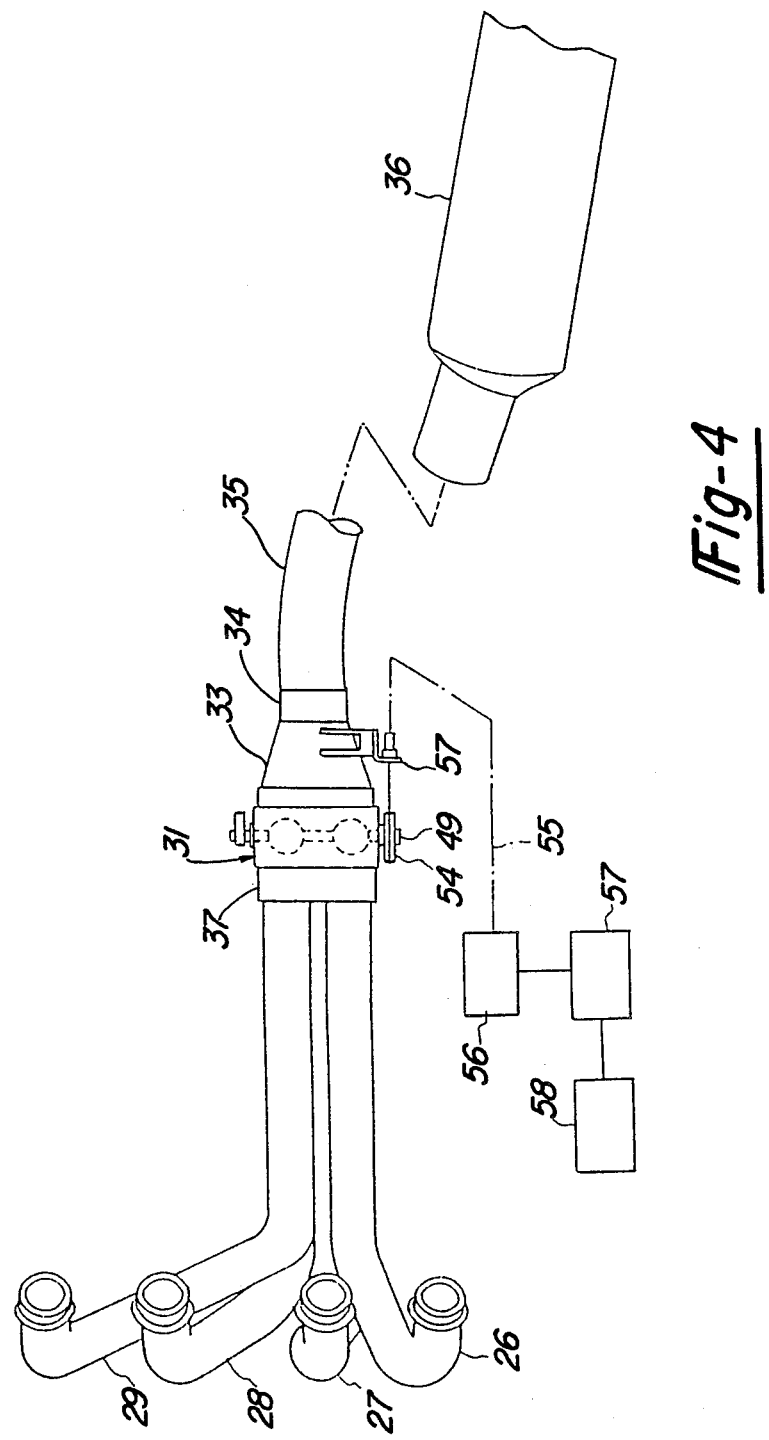
FIG. 4 is a top plan view of the exhaust system and shows the control device for the exhaust control valve in a schematic fashion.
Figure 5:
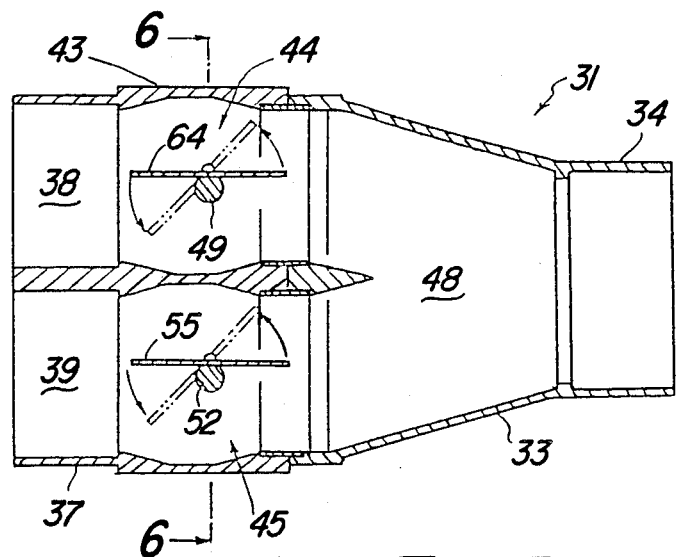
FIG. 5 is an enlarged cross-sectional view taken along a vertical plane showing the control valve.

Referring now, additionally, to FIGS. 2 through 4, the engine 18, as has been previously noted, is of the four cylinder in line type. It is to be understood, however, that the invention may be utilized in conjunction with multiple cylinder engines having other configurations. However, the invention has particular utility with engines having aligned cylinder bores such as are found with in line engines or V-type multiple cylinder engines.

The engine is provided with exhaust ports which are formed in the cylinder 19, or more particularly in a cylinder head 25 that is affixed to the cylinder block 19 in a known manner. In the illustrated embodiment, the exhaust ports formed in the cylinder head 25 extend forwardly and downwardly. Individual exhaust pipes 26, 27, 28, and 29 are affixed at their inlet ends to the cylinder head 25 so as to receive the exhaust gases delivered to the exhaust ports of the cylinder head. The exhaust pipes 26, 27, 28, and 29 extend forwardly from the cylinder head 25 and then downwardly and turn rearwardly so as to pass beneath the combined crankcase transmission assembly 21.

In accordance with the invention, the exhaust pipes 26, 27, 28, and 29 are collected at an exhaust control device, indicated generally by the reference numeral 31 which is in the form of a valve assembly. The exhaust control device 31 is configured, as will be described, and is positioned immediately beneath the engine transmission assembly 21. In addition, an outer cowling 32, which is affixed in a suitable manner to the frame assembly 21, encircles the engine 18 and certain running components of the vehicle, including the portion of the exhaust system, and including the exhaust control device 31.

The exhaust control device 31 is formed with a collector, expansion section 33 in which an expansion chamber, to be described, is contained. A slip joint 34 formed at the end of the collector section 33 connects the control device 31 to a tailpipe 35 in which a silencing muffler 36 is provided. The muffler 36 lies on one side of the rear wheel 16 and discharges the exhaust gases to the atmosphere.

Referring now, additionally, to FIGS. 5 through 8, the exhaust control device 31 will be described. The exhaust control device 31 includes an outer valve housing that includes an inlet section 37 that provides a plurality of slip joints 38, 39, 41, and 42 that receive the trailing or downstream ends of the exhaust pipes 26, 27, 28, and 29, respectively. It should be noted that the passages 38 and 42 lie vertically above the passages 39 and 41, and in this embodiment the passages 38 and 39 and 41 and 42 are vertically aligned with each other. As will become apparent, various other configurations are possible within the scope of the invention. In addition, the exhaust pipes 26 through 29 may be affixed to the control device 31 by means other than by means of slip joints, such as through a flanged connection.

Downstream of the inlet section 37, the control device 31 is provided with an integral main body portion 43 in which flow passages 44, 45, 46, and 47 are formed.

The flow passages 44 through 47 are generally cylindrical in shape and are aligned with the inlet openings 38, 39, 41, and 42, respectively. In this way, the exhaust gases may freely flow through the valve body 43.

The expansion section 33 is formed downstream of the passages 44 through 47 and defines an expansion chamber 48 into which the exhaust gases are permitted to expand. From there, the exhaust gases pass through the slip joint 34 for discharge to the tailpipe 35 as aforenoted.

In order to avoid the likelihood of exhaust pulses from one cylinder interfering with the other, a control valve arrangement is incorporated within the valve body 43. This control valve includes a first control valve shaft 49 that is rotatably journaled within the valve body portion 43 by means of a pair of spaced apart bearings 51 that are disposed outwardly of the passages 44 and 47. In this way, the shaft 49 may be relatively short and will be effectively journaled. A similar valve shaft 52 extends across the passages 45 and 46 and is journaled by spaced apart bearings 53. It should be noted that the shaft 49 and 52 extend in a generally horizontal direction and are parallel to each other. On one side of the control device 31 there is affixed to the shaft 49 a pulley 54. The pulley 54 is connected by means of flexible transmitters 55 to a controlling motor 56. The flexible transmitters 55 have sheath portions that are affixed to a bracket 57 that is carried by the control device 31 at this one side. The control device 56 is operated by means of a computer control circuit 57 that receives an input signal responsive to engine speed or some other condition by means of a sensor 58 which forms a part of the engine ignition circuit. A suitable program can be contained within the device 57 operating the control device 31 to achieve the desired result.

The throttle valve shafts 49 and 52 are interconnected at the side of the control device 31 opposite to the pulley 54 by means of a linkage system, indicated generally by the reference numeral 59. This linkage system 59 includes a pair of levers 61 and 62 that are affixed for rotation to the respective throttle valve shafts 49 and 52. An adjustable length link 63 is pivotally connected at its opposite ends to the outer ends of the levers 61 and 62 for completing the mechanical connection between the throttle valve shafts 49 and 52.

Butterfly type throttle valves 64, 65, 66, and 67 are affixed to the throttle valve shafts 49 and 52 within the passages 44, 45, 46, and 47 respectively. These throttle valves 64, 65, 66, and 67 are configured so that they will provide substantially unrestricted flow through the passages 44, 45, 46, and 47 when they are fully opened. When the throttle valves 64, 65, 66, and 67 are moved to a fully closed position, they will occupy approximately 70% of the effective cross-sectional area of the passages 44, 45, 46, and 47. This has been found to give good results in connection with improving the engine performance. The theory on which the throttle valves are controlled is as set forth in aforenoted co-pending applications, Ser. Nos. 935,340 and 935,342. Generally, the throttle valves are closed at lower engine speeds so as to prevent the transmission of pulses back through the exhaust system from the expansion chamber 48 to the respective exhaust ports of the engine which would tend to interfere with the flow of exhaust gases. As the engine speed increases, the respective throttle valves are opened so as to permit good high speed performance. The sequence in which the respective valves are opened can be determined in accordance with the desired engine characteristics. Generally, however, the performance of the engine will be improved throughout the speed and load ranges since the engine can be tuned for good high speed performance and also good low speed and mid-range performance. The control device 31 may also be used to control exhaust gas emissions by providing a self E.G.R. effect.

In order to further minimize the likelihood of thermal expansion and reduce weight, the valve body 43 is provided with a plurality of longitudinally extending lightening passages 68.

Figure 6:
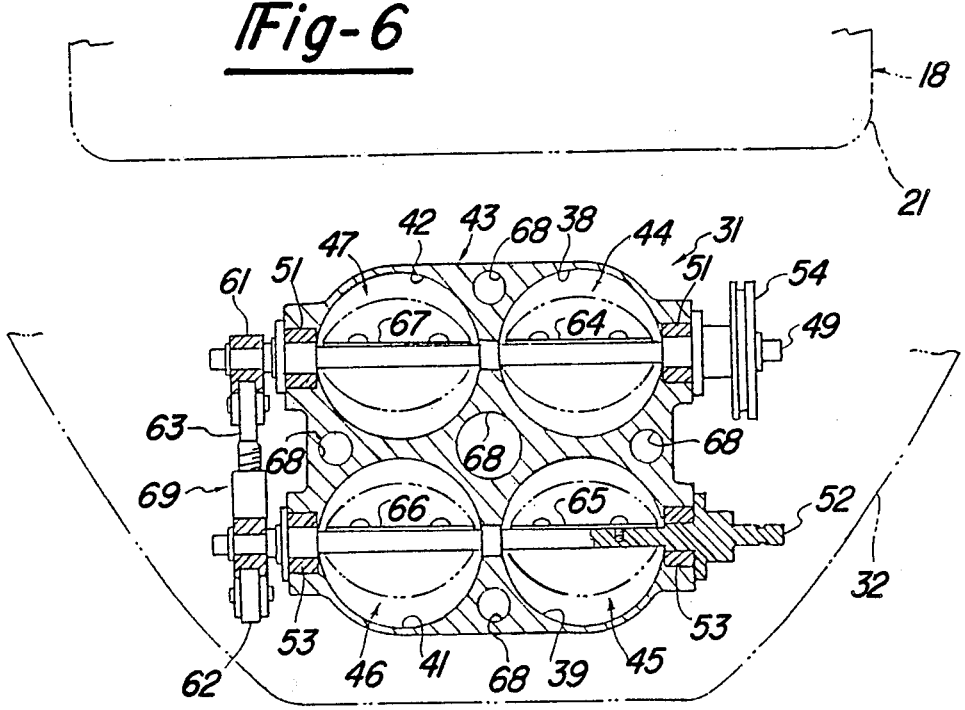
FIG. 6 is an enlarged cross-sectional view taken along the line 6—6 of the FIG. 5.
Figure 7:
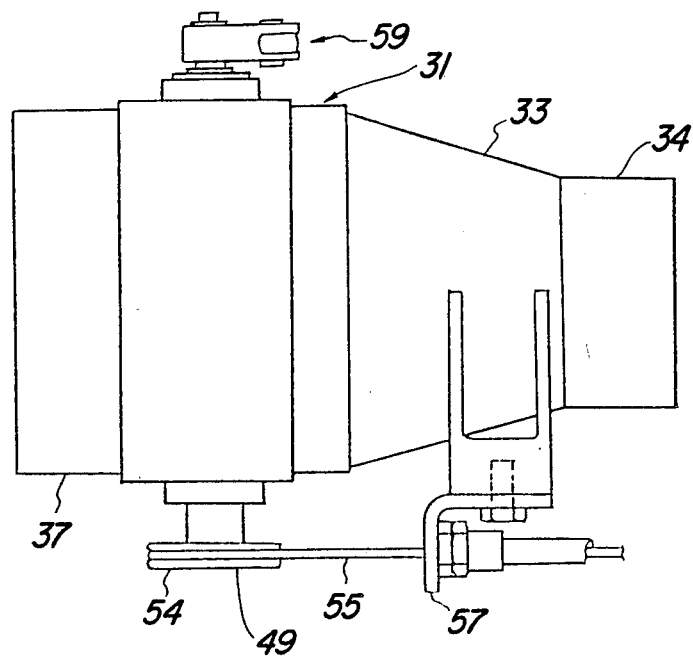
FIG. 7 is a top plan view showing the exhaust control device.
Figure 8:
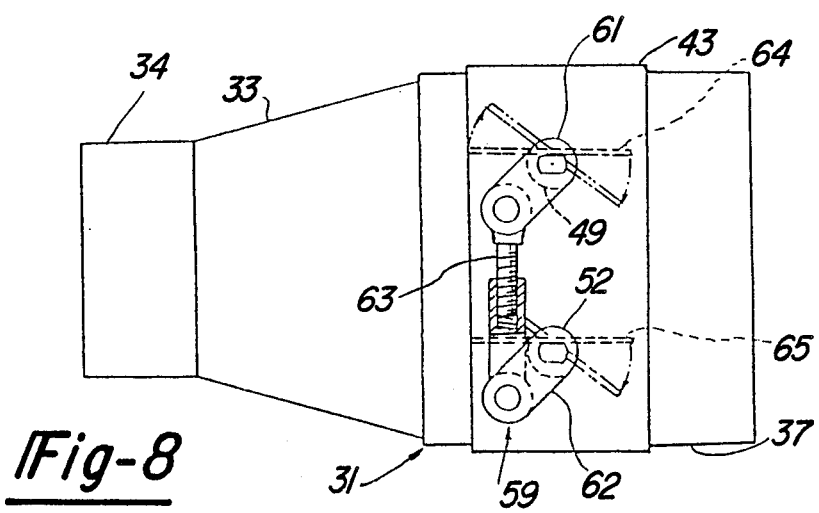
FIG. 8 is a side elevational view showing the exhaust control device.

As may be seen in FIG. 6, the configuration of the valve body 43 and, specifically, the location of the passages and linkage on the opposite side of the valve body from the pulley 54, permits a very compact overall relationship so that the motorcycle can be leaned by the rider when cornering without any interference. This made possible because of the vertically aligned, horizontally spaced exhaust passages which communicate with the various exhaust pipes 26, 27, 28, and 29. Although the valve shafts are aligned in a common vertical plane, it is to be understood that one of the valve shafts may be longitudinally offset with respect to the other in order to maintain the desired spacing between the engine exhaust ports and the respective control or throttle valves.

Figure 9:
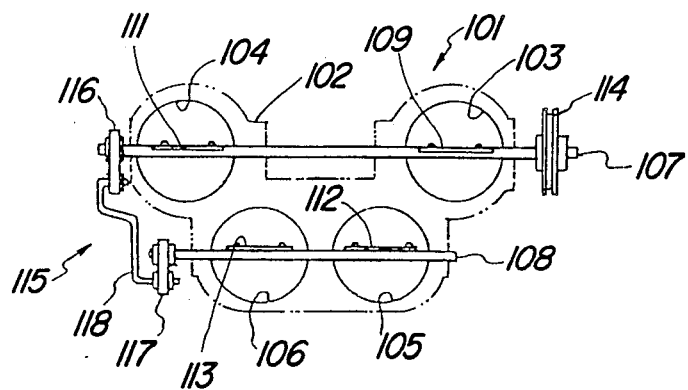
FIG. 9 is a cross-sectional view, in part similar to FIG. 6, showing another embodiment of the invention.

Another exhaust control device constructed in accordance with another embodiment of the invention is illustrated in FIG. 9 and is identified generally by the reference numeral 101. The device 101 differs from the control device 31 only in the configuration of the various exhaust passages through it, and for that reason, only a transverse cross-sectional view is believed to be necessary to understand the construction and operation of this embodiment.

The control device 101 includes an outer housing 102 in which an upper most pair of exhaust passages 103 and 104 are formed, corresponding to the passages 44 and 47 of the previously described embodiment. However, in this example, the passages 103 and 104 are transversely spaced apart a substantially greater distance than a lower pair of passages 105 and 106 formed in the body 102. As with the previously described embodiment, there are throttle valve shafts 107 and 108 that are journaled within the body 102 on respective, parallel, horizontally extending axes. Throttle valves 109, 111, 112, and 113 are affixed to the shafts 107, 108, respectively, and lie within the passages 103, 104, 105, and 106 for controlling the flow through them. A pulley 114 is affixed to the throttle valve shaft 107 for operating it and a linkage system, indicated generally by the reference numeral 115 and comprised of a pair of levers 116 and 117, and an interconnecting link 118 transmits motion from the throttle valve shaft 107 to the throttle valve shaft 108.

It should be noted that the configuration is such that the body 102 is narrower at the bottom rather than the top. This will permit a greater degree of leaning and a more compact construction.

Figure 10:
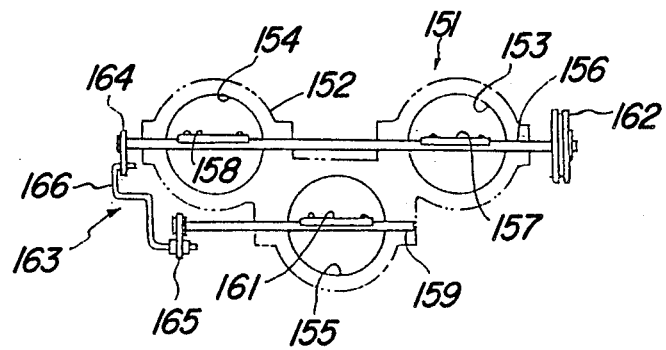
FIG. 10 is a cross-sectional view, in part similar to FIGS. 6 and 9, showing a still further embodiment of the invention.

FIG. 10 shows another embodiment of the invention wherein the exhaust control device is shown in cross-section and is indicated generally by the reference numeral 151. This device is intended to be used in an engine having three exhaust pipes and, to this end, a valve body 152 of the control device 151 is provided with a pair of spaced apart exhaust passages 153 and 154 that lie on a common horizontal plane. A lower exhaust passage 155 is positioned transversely between the passages 153 and 154 so as to provide a configuration of the same general type as shown in FIG. 9.

A throttle valve shaft 156 is journaled in the body 152 and carries a pair of throttle valves 157 and 158 that lie within the passages 153 and 154, respectively. A lower throttle valve shaft 159 extends through the body 152 parallel to the shaft 156 and below it. A throttle valve 161 is affixed to the shaft 159 within the passage 155.

As with the previously described embodiments, a pulley 162 is affixed to the shaft 156 for operating it. A linkage system, indicated generally by the reference numeral 163 and comprised of a pair of levers 165, 165, and an interconnecting link 166 interconnects the throttle valve shafts 156 and 159 for simultaneous rotation.

It should be readily apparent that each of the described embodiments is extremely effective in providing a compact exhaust control device that will improve the engine performance under all running conditions. Although a number of embodiments of the invention have been illustrated and described, various other changes and modifications may be made. For example, other devices than a pulley may be connected to one of the throttle valve shafts for operating it and other forms of linkage systems or gear units or the like may be provided to transmit rotary motion from one throttle valve shaft to the other. Various other changes and modifications may be made without departing from the spirit and scope of the invention, as defined by the appended claims.

I claim:

1. An exhaust system for an internal combustion engine having first and second exhaust ports, a first exhaust pipe extending from said first exhaust port, and a second exhaust pipe extending from said second exhaust port, a single valve body formed with first and second exhaust passages spaced vertically one above the other, means for communicating a horizontally extending portion, of said first exhaust pipe with said first exhaust gas passage of said valve body, means for communicating a horizontally extending section of said second exhaust pipe with said second exhaust gas passage of said valve body, a first valve shaft journaled in said valve body for rotation about a horizontally extending axis, a second valve shaft journaled in said valve body and rotatable about a horizontally extending axis, a first valve element fixed to said first valve shaft within said first exhaust gas passage for controlling the flow therethrough, a second valve element fixed to said second valve shaft within said second exhaust gas passage for controlling the flow therethrough, and means for simultaneously connecting said first and said second shafts for common rotation.

2. An exhaust system as set forth in claim 1 further including a further exhaust gas passage formed in the valve body and communicating with a horizontally extending portion further exhaust pipe, said further exhaust gas passage lying in a common horizontal plane with the first exhaust gas passage with the first valve shaft extending therethrough, and a further valve element fixed to said first valve shaft within said further exhaust gas passage.

3. An exhaust system as set forth in claim 1 wherein the valve body is formed with a third exhaust passage communicating with a third exhaust pipe extending from a third exhaust port of the engine and a fourth exhaust passage communicating with a fourth exhaust pipe extending from a fourth exhaust port of the engine, there being a third valve element fixed to said first valve shaft within said third exhaust gas passage for controlling the flow therethrough and a fourth valve element fixed to the second valve shaft within said fourth exhaust gas passage for controlling the flow therethrough.

4. An exhaust system for an internal combustion engine having first, second and further exhaust ports, a first exhaust pipe extending from said first exhaust port, a second exhaust pipe extending from said second exhaust port a further exhaust pipe extending from said further exhaust port, a single valve body formed with first, second and further exhaust passages, means for communicating said first exhaust pipe with said first exhaust gas passage of said valve body, means for communicating said second exhaust pipe with said second exhaust gas passage of said valve body, means for communicating said further exhaust pipe with said further exhaust passage, a first valve shaft journaled in said valve body, a second valve shaft journaled in said valve body, a first valve element fixed to said first valve shaft within said fist exhaust gas passage controlling the flow therethrough, a second valve element fixed to said second valve shaft within said second exhaust gas passage for controlling the flow therethrough, a further valve element fixed to said first valve shaft within said further element gas passage and means for simultaneously connecting said first and said second shafts for common rotation, some of the exhaust gas passages being positioned vertically above each other.

5. An exhaust system as set forth in claim 4 wherein the first and further exhaust gas passages are positioned transversely outwardly from the second exhaust gas passage.

6. An exhaust system for an internal combustion engine having first, second, third and forth exhaust ports, a first exhaust pipe extending from said first exhaust port, a second exhaust pipe extending from said second exhaust port, a third exhaust pipe extending from said third exhaust port, a fourth exhaust pipe extending from said fourth exhaust port, a single valve body formed with first, second, third, and fourth exhaust passages, means for communicating said first exhaust pipe with said first exhaust passage of said valve body, means for communicating said second exhaust pipe with said second exhaust passage of said valve body, means communicating said third exhaust pipe with said third exhaust passage of said valve body, means for communicating said fourth exhaust pipe with said fourth exhaust passage of said valve body, a first valve shaft journaled in said valve body, a second valve shaft journaled in said valve body, a first valve element fixed to said first valve shaft within said first exhaust passage for controlling the flow therethrough, a second valve element fixed to said second valve shaft within said second exhaust passage for controlling the flow therethrough, a third valve element fixed to said first valve shaft within said third exhaust gas passage for controlling the flow therethrough, a fourth valve element fixed to said second valve shaft within said fourth exhaust passage for controlling the flow therethrough and means for simultaneously connecting said first and said second shafts for common rotation, said first and third exhaust gas passages being lying above said second and fourth exhaust gas passages.

7. An exhaust system as set forth in claim 6 wherein the first and third exhaust gas passages are spaced apart transversely a greater distance than the spacing between the second and fourth exhaust gas passages.

8. An exhaust system for a motorcycle having a single dirigible front wheel and a single driven rear wheel, an internal combustion engine having first and second exhaust ports, a first exhaust pipe extending from said first exhaust port, a second exhaust pipe extending from said second exhaust port, a single valve body formed with first and second exhaust passages, means for communicating said first exhaust pipe with said first exhaust gas passage of said valve body, means for communicating said second exhaust pipe with said second exhaust gas passage of said valve body, a first valve shaft journaled in said valve body, a second valve shaft journaled in said valve body, a first valve element fixed to said first valve shaft within said first exhaust gas passge for controlling the flow therethrough, a second valve element fixed to said second valve shaft within said second exhaust gas passage for controlling the flow therethrough, and means for simultaneously connecting said first and said second shafts for common rotation, said engine being positioned within said motorcycle between said front and rear wheel and containing a transmission assembly for driving said rear wheel, said single valve body being positioned beneath said transmission.

9. An exhaust system as set forth in claim 8 wherein the exhaust pipes extend forwardly from a transversely extending cylinder arrangement and then downwardly and rearwardly.

10. An exhaust system as set forth in claim 9 wherein the first and second exhaust gas passages are vertically spaced one above the other.

11. An exhaust system as set forth in claim 9 further including a further exhaust gas passage formed in the valve body and communicating with a further exhaust pipe, said further exhaust gas passage lying in a common horizontal plane with the first exhaust gas passage with the first valve shaft extending therethrough, and a further valve element fixed to said first valve shaft within said further exhaust gas passage.

12. An exhaust system as set forth in claim 11 wherein at least some of the exhaust gas passages are positioned vertically above each other.

13. An exhaust system as set forth in claim 12 wherein the first and further exhaust gas passages are positioned transversely outwardly from the second exhaust gas passage.

14. An exhaust system as set forth in claim 10 further including a further exhaust gas passage formed in the valve body and communicating with a further exhaust pipe, said further exhaust gas passage lying in a common horizontal plane with the first exhaust gas passage with the first valve shaft extending therethrough, and a further valve element fixed to said first valve shaft within said further exhaust gas passage.

15. An exhaust system as set forth in claim 10 wherein the valve body is formed with a third exhaust passage communicating with a third exhaust pipe extending from a third exhaust port of the engine and a fourth exhaust passage communicating with a fourth exhaust pipe extending from a fourth exhaust port of the engine, there being a third valve element fixed to said first valve shaft within said third exhaust gas passage for controlling the flow therethrough and a fourth valve element fixed to the second valve shaft within said fourth exhaust gas passage for controlling the flow therethrough.

16. An exhaust system as set forth in claim 15 wherein the first and third exhaust gas passages lie above the second and fourth exhaust gas passages.

17. An exhaust system as set forth in claim 16 wherein the first and third exhaust gas passages are spaced apart transversely a greater distance than the spacing between the second and fourth exhaust gas passages.

* * * * *